(12) United States Patent
Couch et al.

(10) Patent No.: US 8,257,091 B2
(45) Date of Patent: Sep. 4, 2012

(54) MATCHING LEARNING OBJECTS WITH A USER PROFILE USING TOP-LEVEL CONCEPT COMPLEXITY

(75) Inventors: Jacob D. Couch, Oklahoma City, OK (US); Jeremy K. Espenshade, Lancaster, PA (US); Scott D. Reynolds, Naperville, IL (US); Curtis Stratman, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 1247 days.

(21) Appl. No.: 12/027,149

(22) Filed: Feb. 6, 2008

(65) Prior Publication Data
US 2009/0197232 A1    Aug. 6, 2009

(51) Int. Cl.
*G09B 3/00* (2006.01)
(52) U.S. Cl. ......................... 434/322; 434/350
(58) Field of Classification Search .......... 434/156–185, 434/219, 322–365; 707/706, 731, 738, 786
See application file for complete search history.

(56) References Cited

U.S. PATENT DOCUMENTS

2006/0035206 A1* 2/2006 Clark et al. ................... 434/350
2008/0018670 A1* 1/2008 Araki ............................ 345/660
* cited by examiner

*Primary Examiner* — Timothy Musselman
(74) *Attorney, Agent, or Firm* — Marcia L. Doubet

(57) ABSTRACT

In a method and system for matching learning objects with a user profile, a top-level concept structure, including a keyword hierarchy for each of one or more top-level concepts, can be used to determine the complexity of a learning object. The learning object can include one or more learning object keywords related to one or more top-level concepts contained in the top-level concept structure. The learning object keywords can be assigned a complexity score based upon their location within the keyword hierarchy, and the complexity scores for all of the learning object keywords relating to a top-level concept can be aggregated to generate a learning object top-level concept complexity score. The learning object top-level concept complexity score can be compared with a user's experience rating for that top-level concept and be used to select an appropriate learning object.

28 Claims, 3 Drawing Sheets

MATCHING LEARNING OBJECTS WITH A USER PROFILE USING TOP-LEVEL CONCEPT COMPLEXITY

BACKGROUND OF THE INVENTION

Electronic learning, or "eLearning," refers to the use of computer technology to enhance learning. Online learning, web-based training, and technology-delivered instruction are all examples of eLearning. Some eLearning courses include one or more learning objects. Learning objects can be portable discrete modules that explain a stand-alone learning objective. Learning objects can be requested by a user (e.g., downloaded or selected) to inform the user about a desired subject matter.

Conventional learning objects can contain metadata. This metadata can include information regarding the learning object's complexity, as perceived by the creator of the learning object, and the semantic density (i.e., the number of concepts covered) of the learning object. In conventional eLearning systems, this metadata, while it is not usually provided to users, can be used to approximate the complexity of a given learning object relative to other learning objects covering similar learning objectives. Given the metadata approximating learning object complexity, a user can attempt to locate a learning object appropriate to the user's experience level, which can be contained in a user profile.

Problems may arise, however, with conventional eLearning systems when metadata is used to attempt to match learning objects with a user's experience level. First, the metadata for complexity is generally not standardized among learning objects, and can therefore be an inaccurate indication of learning object complexity. Furthermore, semantic density can also be an inaccurate indication of learning object complexity because semantic density measures only the number of concepts covered, not the complexity of these concepts.

BRIEF SUMMARY OF THE INVENTION

Methods and systems for matching learning objects with a user profile using top-level concept complexity are described, wherein the user profile includes at least one top-level concept experience rating for one or more top-level concepts. A learning object can be received, where the learning object can include one or more learning object top-level concepts and one or more learning object keywords related to each learning object top-level concept. The one or more learning object top-level concepts can also be contained within a top-level concept structure, and the top-level concept structure can include a keyword hierarchy for each top-level concept having groups of keywords. The one or more learning object keywords have a location within the keyword hierarchy for the learning object top-level concept.

A complexity score can be assigned to each of the learning object keywords using the location of the learning object keywords in the keyword hierarchy for the learning object top-level concept. The complexity scores for all of the learning object keywords can be aggregated for each learning object top-level concept, thereby generating a learning object top-level concept complexity score. The learning object top-level concept complexity score can be compared with the user top-level concept experience rating, and the learning object can be provided to the user when the user's top-level concept experience rating is proximate to the level indicated by the learning object top-level concept complexity score.

DETAILED DESCRIPTION OF THE INVENTION

Processes and systems for matching learning objects with a user profile using top-level concept complexity, wherein the user profile comprises at least one top-level concept experience rating for one or more top-level concepts are described. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The processes and systems for matching learning objects with a user profile using top-level concept complexity can receive a top-level concept structure, which can include a keyword hierarchy for each of one or more top-level concepts. Each top-level concept can be associated with a set of keywords, which includes groups of the keywords grouped based upon keyword specificity. The keywords can be grouped together based upon their specificity, and the groups can be associated with a complexity score. A learning object can be received that includes one or more learning object top-level concepts and one or more learning object keywords related to each learning object top-level concept. The one or more learning object top-level concepts are contained within the top-level concept structure. The complexity score of each of the learning object keywords can be identified by locating the learning object keywords in the keyword hierarchy for the learning object top-level concept. The complexity scores for all of the learning object keywords can be aggregated for each learning object top-level concept, thereby generating a learning object top-level concept complexity score. The learning object top-level concept complexity score can then be compared with the user top-level concept experience, and the learning object can be provided to the user when the user's top-level concept experience is proximate to the level indicated by the learning object top-level concept complexity score.

Figure 1:
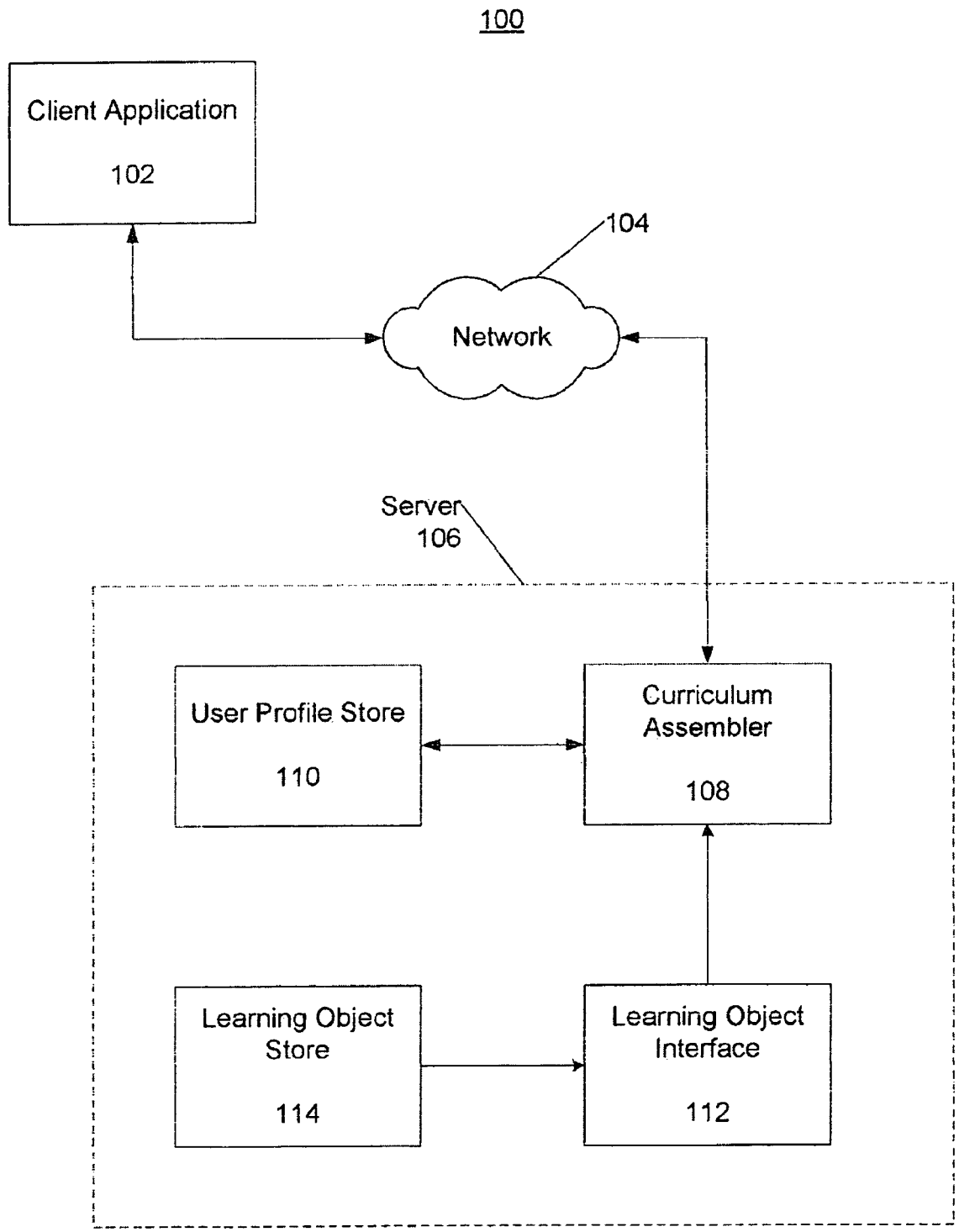
FIG. 1 illustrates an exemplary embodiment of a system for matching learning objects with a user profile using top-level concept complexity.

FIG. 1 illustrates an exemplary embodiment of a system for matching learning objects with a user profile using top-level concept complexity. System 100 includes client application 102, which can be in communication with server 106 through network connection 104. Client application 102 can receive a request for a learning object and transfer the request to curriculum assembler 108, and can also display learning objects in some embodiments. In some embodiments, client application 102 can be a dedicated eLearning delivery system. In some embodiments, client application 102 can be any application that contains a "help" feature, wherein the user can request and/or be provided with learning objects that can contain information about how to use the application or application features. Client application 102 can also be an internet browser in some embodiments. In an exemplary embodiment, a user can provide a request for a learning object relating to a learning objective (i.e., the topic the user wishes to learn about). Client application 102 can transfer this request to curriculum assembler 108 through network connection 104. Network connection 104 conveys data between client application 102 and server 106, and can be any suitable wired or wireless connection.

In one embodiment, the server 106 includes curriculum assembler 108, user profile store 110, learning object interface 112, and learning object store 114. Curriculum assembler 108 can determine the complexity of learning objects and match learning objects to user profiles, as described further below. Curriculum assembler 108 can be implemented as a middleware application in some embodiments. While curriculum assembler 108 is shown in exemplary system 100 to be located on server 106, curriculum assembler 108 can be located on a client computer (e.g., the same location as client application 102), on a remote server, or in any suitable location. In some embodiments, there is one curriculum assembler for every one learning object interface 112.

User profile store 110 can contain stored user profiles, which can be retrieved by curriculum assembler 108. Curriculum assembler 108 can match learning objects with the user profiles as described further below. User profiles can include at least one top-level concept experience rating for one or more top-level concepts. For a given subject area, the top-level concept refers to the broadest term that describes a field. For example, in the server technician subject area, top-level concept examples include installation, configuration, and service and support fields.

A top-level concept experience rating can be a numerical value corresponding to a user's experience level in the top-level concept field. Any suitable methodology can be used to derive the top-level concept experience rating, which can be expressed in some embodiments as a fraction of the top-level experience rating of an expert in the field. Exemplary methodologies for determining the top-level concept experience rating include using the number of years of experience in the top-level concept field, having the user estimate his or her experience relative to an expert in the field, having the user take an exam or sample course designed and using the user's feedback to estimate their top-level experience rating, or any combination thereof.

While user profile store 110 is shown in exemplary system 100 to be located on server 106, user profile store 110 can be located on a client computer (e.g., the same location as client application 102), on a remote server, or in any suitable location. Also, while user profile store 110 is shown as a separate entity in exemplary system 100, user profile store 110 can in some embodiments be combined with learning object store 114 as a combined general storage. In some embodiments, user profile store 110 can be managed by learning object interface 112, which can transfer the user profiles to curriculum assembler 108 from user profile store 110.

Learning object interface 112 can be used to manage the learning objects contained in learning object store 114. Learning object interface 112 can contain login profiles permitting access to learning object store 114 and/or sortable information about all of the learning objects stored within learning object store 114, deliver learning objects in response to requests by users, and can provide a user interface for the learning object store 114, among other functions. In some embodiments, learning object interface 112 can perform the functions of a learning management system. While displayed as a separate entity in exemplary system 100, learning object interface 112 can in some embodiments be integrated with learning object store 114.

Learning object interface 112 can contain a top-level concept structure. The top-level concept structure can include a keyword hierarchy for each top-level concept contained in learning object store 114. The keyword hierarchy can include keywords that are grouped based upon keyword complexity. That is, the keyword hierarchy can be an organization of the keywords related to the top-level concept into groups based upon the complexity of the material related to the keyword. In some embodiments, the organization can be based upon the specificity of the keyword (i.e., based upon the principle that the more specific the keyword, the more complex the underlying concept). In some embodiments, the organization can be based upon logical relationships between keywords (i.e., based upon the principle that keywords relating to the same underlying concept should be grouped together).

In some embodiments, the top-level concept structure can be a simple knowledge organization system ("SKOS") semantic taxonomy graph. In these embodiments, the keywords can be organized into tiers, with keywords relating to broad concepts being closer to the top level concept, and keywords relating to narrow concepts being further from the top level concept. For example, for a top-level concept "Operating Systems," the first tier could include the keyword "Windows," relating to Windows® operating systems. A second tier, and therefore more specific group of keywords, could include the keyword "Windows® graphic user interface."

Learning object store 114 stores learning objects, and provides the learning objects to the learning object interface when they are requested (e.g., by a user, and/or by curriculum assembler 108). Learning object store 114 can be a database, a file system, or any suitable type of data store.

Figure 2:
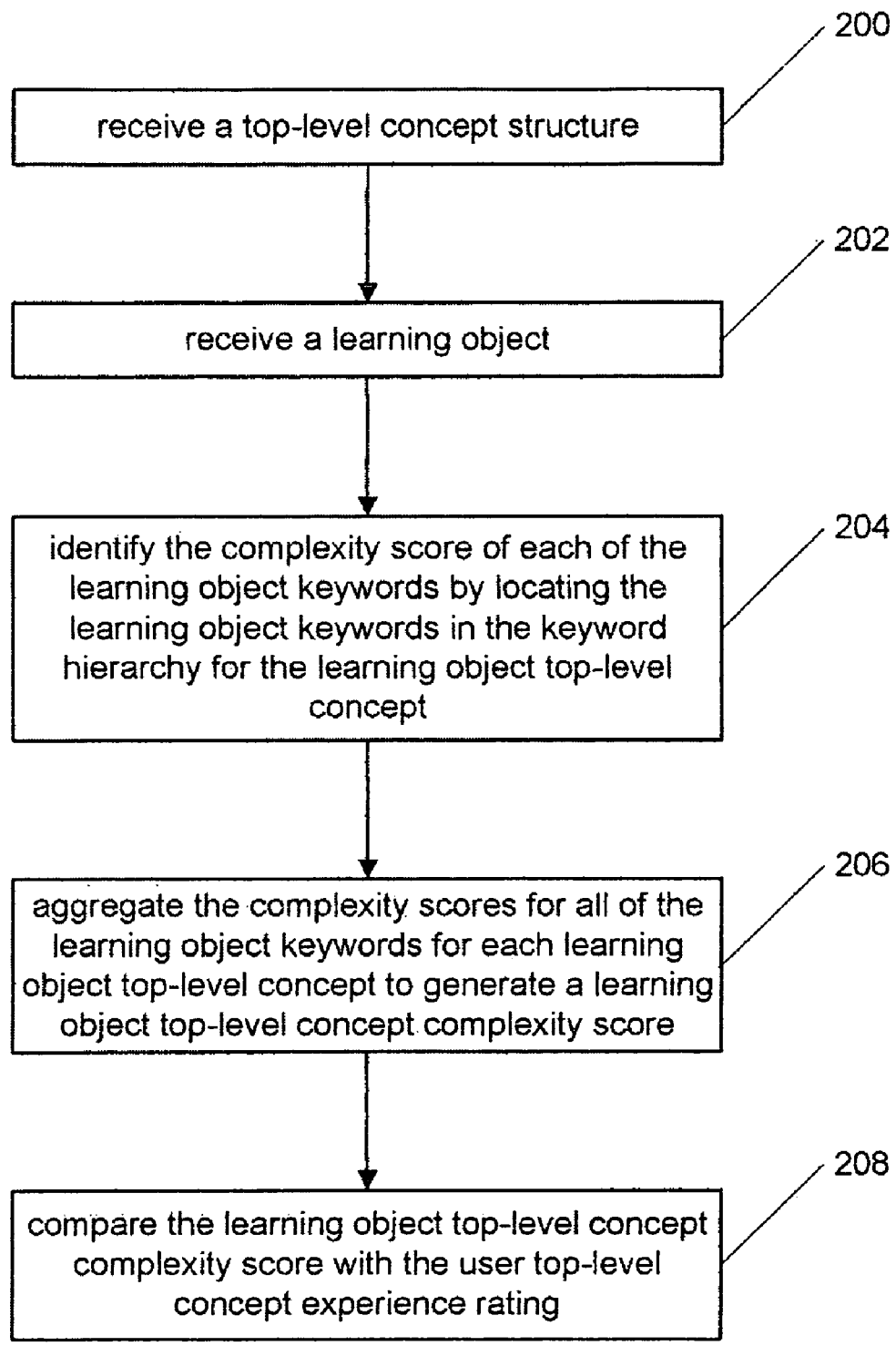
FIG. 2 illustrates an exemplary embodiment of a process for matching learning objects with a user profile using top-level concept complexity.

FIG. 2 illustrates an exemplary embodiment of a process for matching learning objects with a user profile using top-level concept complexity. In some embodiments, one or more of steps 200-206 are performed (e.g., by a curriculum assembler and/or by a learning object interface) before a request for a learning object is made (e.g., during a configuration stage). In an embodiment where all of steps 200-206 are performed before a request for a learning object is made, the top-level concept complexity scores for each learning object can be stored. Such embodiments can be advantageous because steps 200-206 do not need to be repeated for every learning object request, which can result in saving time. In an alternative embodiment, steps 200-206 can be performed when a learning object is requested. These embodiments can be advantageous because less storage space is needed, since the top-level concept complexity scores are not stored. In some embodiments, steps 200-206 can be divided between when the configuration stage is performed and when a request for a learning object is received. For example, a top-level concept structure can be received during a configuration stage, and steps 202-206 can be performed after a learning object is requested.

A top-level concept structure, which functions as described hereinabove, can be received (step 200). The top-level concept structure can be received from a learning object interface by a curriculum assembler, as described hereinabove. Alternatively, in some embodiments, the top-level concept structure can be received from an external source, or can be input by a user. In some embodiments, the top-level concept structure does not need to be received (e.g., in embodiments where a curriculum assembler or a learning object interface perform comparison step 208 and locally store the top-level concept structure). In these embodiments, step 200 can be omitted.

Figure 3:
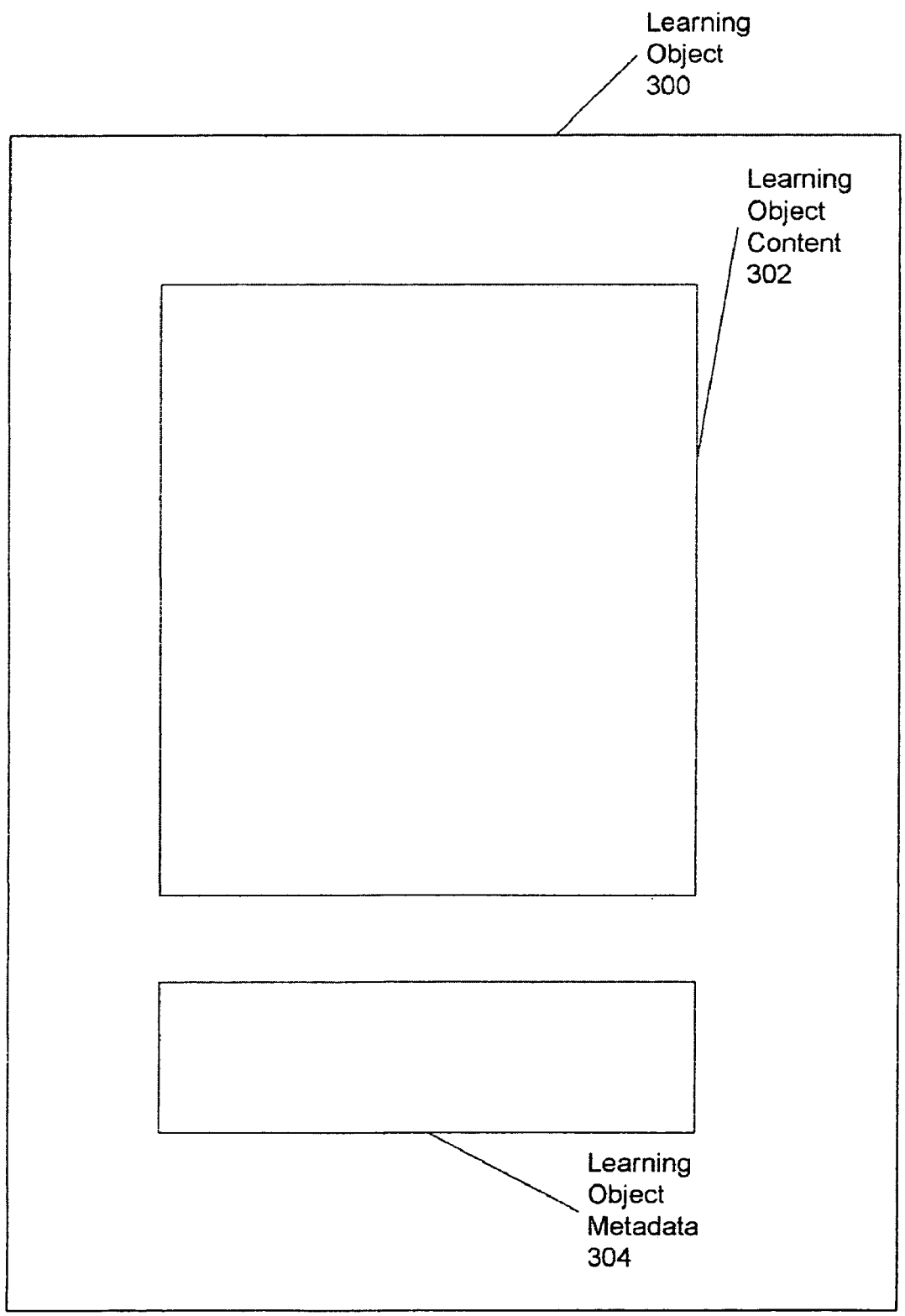
FIG. 3 illustrates an exemplary embodiment of a learning object.

FIG. 3 illustrates an exemplary embodiment of a learning object. Learning object 300 can include learning object content 302 and learning object metadata 304. Learning object content 302 can pertain to one or more learning object top-level concepts and the learning object top-level concepts are also contained within the top-level concept structure. Learning object metadata 304 can include information about learning object content, as described hereinabove. In some embodiments, learning object 300 can be a part of a course that includes a plurality of learning objects. In such embodiments, metadata relating to the learning object can be contained in a data structure (e.g., an XML manifest file and/or a database entry) associated with the course to which learning object 300 belongs. Learning object 300 can also include one or more learning object keywords related to each learning object top-level concept. The learning object keywords can be found in learning object metadata 304, or in learning object content 302. The learning object keywords also have a location within the keyword hierarchy for the learning object top-level concept, contained within the top-level concept structure.

Referring again to FIG. 2, a learning object can be received, for example, by a curriculum assembler (step 202). The learning object can be received as part of a course or individually. In some embodiments, the learning object metadata is received instead of the entire learning object. Such embodiments can be advantageous because the bandwidth needed to perform the process for matching learning objects with a user profile using top-level concept complexity can be reduced. The learning object metadata can be received as part of a data structure associated with a course, functioning as described hereinabove, where the data structure contains learning object metadata for one or more learning objects.

The curriculum assembler can assign a complexity score to each of the learning object keywords using the location of the learning object keywords in the keyword hierarchy for the learning object top-level concept (step 204). In some embodiments, the learning object keywords can be extracted from the learning object. These keywords can then be located in the keyword hierarchy for a top-level concept. In some embodiments, learning object keywords pertaining to more complex subject material receive higher complexity scores. For example, in embodiments where the top-level concept structure is a SKOS graph, the top level concept can be assigned a complexity score of zero, and the most specific group of keywords can be assigned a complexity score of one. Keywords falling in between the extreme values can be weighted accordingly based upon the specificity of the keyword, with broader keywords being assigned a lower complexity score than more specific keywords. In the "operating system" example described above, for example, a learning object containing the "Windows" keyword would receive a lower complexity score than a learning object containing the keyword "Windows graphic user interface."

The curriculum assembler can aggregate the complexity scores for all of the learning object keywords for each learning object top-level concept, thereby generating a learning object top-level concept complexity score (step 206). The aggregation can be done by any suitable method, provided that the complexity scores for all of the learning object keywords are accounted for in the relevant learning object top-level concept (e.g., by summing the complexity scores, by taking the arithmetic mean of the complexity scores, etc.). Other methods of aggregation can include simple aggregation, weighted aggregation, cosine similarity, or complex methods of vector comparison, for example. The learning object top-level concept complexity score represents the complexity of the learning object in the top-level concept being analyzed.

In response to receiving a request for a learning object, the curriculum assembler can compare the learning object top-level concept complexity score to the user top-level concept experience rating (step 208). The request can be submitted by the user, or by a third party, such as a continuing education administrator or an automated continuing education system. The learning object can be provided to the user (e.g., sent to the user, and/or provided to the third party that requested the learning object) when the user's top-level concept experience rating is proximate to the level indicated by the learning object top-level concept complexity score. Because both the user top-level concept experience rating and the learning object top-level concept complexity score are numerical values, any suitable algorithm can be used to compare the values.

For example, in the SKOS example described above, the complexity scores can all be less than or equal to 1. In an embodiment where the aggregate of complexity scores is done by arithmetic mean, the learning object top-level concept complexity score will be less than or equal to 1. In some embodiments, the user top-level concept experience rating can be represented as a fraction of an expert experience level for that top-level concept, and could therefore be also less than or equal to 1. In these embodiments, the learning object top-level concept complexity score and the user top-level concept experience rating can be compared, and if the values are proximate, then the learning object can be provided to the user.

In an exemplary embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

A method and system for matching learning objects with a user profile using top-level concept complexity has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A computer-implemented method for matching learning objects with a user profile using top-level concept complexity, wherein the user profile comprises at least one top-level concept experience rating for one or more top-level concepts, the method comprising using a processor of the computer for:
    receiving a learning object, wherein the learning object comprises one or more learning object top-level concepts and one or more learning object keywords related to each learning object top-level concept, wherein the one or more learning object top-level concepts are also contained within a top-level concept structure, wherein the top-level concept structure comprises a keyword hierarchy for each top-level concept comprising groups of keywords, and wherein the one or more learning object keywords has a location within the keyword hierarchy for the learning object top-level concept;
    assigning a complexity score to each of the learning object keywords using the location of the learning object keywords in the keyword hierarchy for the learning object top-level concept;
    aggregating the complexity scores for all of the learning object keywords for each learning object top-level concept, thereby generating a learning object top-level concept complexity score;
    comparing the learning object top-level concept complexity score with the user top-level concept experience rating; and
    providing the learning object to the user when the user's top-level concept experience rating is proximate to a level indicated by the learning object top-level concept complexity score.

2. The method of claim 1 further comprising receiving the top-level concept structure.

3. The method of claim 1 wherein the keyword hierarchy is organized based upon keyword complexity.

4. The method of claim 3 wherein the keyword hierarchy is organized based upon keyword specificity.

5. The method of claim 4 wherein the keyword hierarchy is a simple knowledge organization system graph.

6. The method of claim 1 wherein the aggregation comprises computing an arithmetic mean of the complexity scores for all of the learning object keywords for each learning object top-level concept.

7. The method of claim 1 wherein the method is executed by a curriculum assembler.

8. The method of claim 1 wherein the method is executed by a learning object interface.

9. The method of claim 1 wherein the aggregating comprises computing a sum of the complexity scores for all of the learning object keywords for each learning object top-level concept.

10. The method of claim 1, further comprising:
    receiving a request, from the user, for a learning object; and
    selecting a particular learning object from a plurality of available learning objects, responsive to the request, by performing the receiving, the assigning, the aggregating, and the comparing until the comparing determines that the user's top-level concept experience rating is proximate to the level indicated by the learning object top-level concept complexity score computed for the particular learning object, wherein the providing provides the particular learning object to the user.

11. The method of claim 1 wherein the keyword hierarchy is organized based upon logical relationships among the keywords in the keyword hierarchy.

12. A system for matching learning objects with a user profile using top-level concept complexity, wherein the user profile comprises at least one top-level concept experience rating for one or more top-level concepts, comprising:
    a computer comprising a processor; and
    instructions which are stored on a non-transitory computer-readable medium and which execute, using the processor, to implement functions comprising:
        receiving a learning object, wherein the learning object comprises one or more learning object top-level concepts and one or more learning object keywords related to each learning object top-level concept, wherein the one or more learning object top-level concepts are also contained within a top-level concept structure, wherein the top-level concept structure comprises a keyword hierarchy for each top-level concept comprising groups of keywords, and wherein the one or more learning object keywords has a location within the keyword hierarchy for the learning object top-level concept;
        assigning a complexity score to each of the learning object keywords using the location of the learning object keywords in the keyword hierarchy for the learning object top-level concept;
        aggregating the complexity scores for all of the learning object keywords for each learning object top-level concept, thereby generating a learning object top-level concept complexity score;
        comparing the learning object top-level concept complexity score with the user top-level concept experience rating; and
        providing the learning object to the user when the user's top-level concept experience rating is proximate to a level indicated by the learning object top-level concept complexity score.

13. The system of claim 12 wherein the functions further comprise receiving the top-level concept structure.

14. The system of claim 12 wherein the keyword hierarchy is organized based upon keyword complexity.

15. The system of claim 14 wherein the keyword hierarchy is organized based upon keyword specificity.

16. The system of claim 15 wherein the keyword hierarchy is a simple knowledge organization system graph.

17. The system of claim 12 wherein the aggregation is performed by computing an arithmetic mean of the complexity scores for all of the learning object keywords for each learning object top-level concept.

18. The system of claim 12 wherein the functions are executed by a curriculum assembler located on a server.

19. The system of claim 12 wherein the learning object is provided by a learning object interface.

20. The system of claim 19 wherein the learning object interface is a learning management system.

21. A program product stored on at least one non-transitory computer-readable medium containing program instructions for matching learning objects with a user profile using top-level concept complexity, wherein the user profile comprises at least one top-level concept experience rating for one or more top-level concepts and wherein the program instructions, when executed on a computer, cause the computer to:

receive a learning object, wherein the learning object comprises one or more learning object top-level concepts and one or more learning object keywords related to each learning object top-level concept, wherein the one or more learning object top-level concepts are also contained within a top-level concept structure, wherein the top-level concept structure comprises a keyword hierarchy for each top-level concept comprising groups of keywords, and wherein the one or more learning object keywords has a location within the keyword hierarchy for the learning object top-level concept;

assign a complexity score to each of the learning object keywords using the location of the learning object keywords in the keyword hierarchy for the learning object top-level concept;

aggregate the complexity scores for all of the learning object keywords for each learning object top-level concept, thereby generating a learning object top-level concept complexity score;

compare the learning object top-level concept complexity score with the user top-level concept experience rating; and provide the learning object to the user when the user's top-level concept experience rating is proximate to a level indicated by the learning object top-level concept complexity score.

22. The program product of claim 21 wherein the program instructions further cause the computer to receive the top-level concept structure.

23. The program product of claim 21 wherein the keyword hierarchy is organized based upon keyword complexity.

24. The program product of claim 22 wherein the keyword hierarchy is organized based upon keyword specificity.

25. The program product of claim 23 wherein the keyword hierarchy is a simple knowledge organization system graph.

26. The program product of claim 21 wherein the aggregation comprises computing an arithmetic mean of the complexity scores for all of the learning object keywords for each learning object top-level concept.

27. The program product of claim 21 wherein the program instructions are executed by a curriculum assembler executing on the computer.

28. The program product of claim 21 wherein the learning object is provided by a learning object interface.

\* \* \* \* \*